United States Patent [19]
Proctor

[11] 3,878,934
[45] Apr. 22, 1975

[54] BOTTOM UNLOADERS

[75] Inventor: Sidney Ernest Proctor, High Wycombe, England

[73] Assignee: Austin Hoy and Company Limited, High Wycombe, England

[22] Filed: Nov. 15, 1973

[21] Appl. No.: 416,229

[30] Foreign Application Priority Data
Nov. 28, 1972 United Kingdom............... 55001/72

[52] U.S. Cl. ...................... 198/57; 53/197; 198/95; 198/124
[51] Int. Cl. ........................................... B65g 47/18
[58] Field of Search ......... 198/95, 86, 88, 112, 124, 198/125, 31 AC, 233; 52/197; 199/57

[56] References Cited
UNITED STATES PATENTS

| | | | |
|---|---|---|---|
| 1,785,249 | 12/1930 | Dailey............................. | 198/125 X |
| 2,718,970 | 9/1955 | Dueringer......................... | 198/95 X |
| 3,081,862 | 3/1963 | Knoedler ........................ | 198/233 X |
| 3,481,121 | 12/1969 | Broussard........................... | 198/88 |

*Primary Examiner*—Evon C. Blunk
*Assistant Examiner*—Douglas D. Watts
*Attorney, Agent, or Firm*—Brady, O'Boyle & Gates

[57] ABSTRACT

So as to obviate the need for an integral power pack there is provided a bottom unloader for a storage silo, the unloader comprising a sweep arm conveyor, means mounting the sweep arm conveyor so that it can be swung across the base of the silo and remove material therefrom, the mounting means comprising a pivotal mounting for the sweep arm, and drive means for the sweep arm conveyor comprising a drive shaft arranged for connection to the power take off shaft of a tractor, the shaft being journalled in a housing which housing is pivotable about the pivotal axis of the sweep arm so that the disposition of the drive shaft can be altered. Preferably the drive means for the sweep arm conveyor is arranged to drive a conveyor which is disposed to receive material removed from the silo by the sweep arm conveyor.

10 Claims, 7 Drawing Figures

3,878,934

BOTTOM UNLOADERS

The invention relates to a bottom unloader for a storage container, e.g. a silo, the unloader being of the kind comprising a sweep arm conveyor pivoted at or near the silo wall so that it can be swung across the base of the silo and cut and remove material therefrom.

Known silo unloaders of this kind are supplied with an integral power-pack, e.g. a diesel or electric motor, by means of which the unloader is driven.

It is an object of the invention however, to provide an unloader of the kind referred-to which can be connected to a separate power source, e.g. the power take-off of an agricultural tractor, thus obviating the need for an integral power pack, and which is adjustable to suit different operating conditions.

According to the invention there is provided a bottom unloader for a storage silo, the unloader comprising a sweep arm conveyor, means mounting the sweep arm conveyor so that it can be swung across the base of the silo and remove material therefrom, the mounting means comprising a pivotal mounting for the sweep arm, and drive means for the sweep arm conveyor comprising a drive shaft journalled in a housing which housing is pivotable about the pivotal axis of the sweep arm so that the disposition of the drive shaft can be altered. In a preferred arrangment the sweep arm conveyor is a chain conveyor, the driving sprocket of which is co-axial with the pivotal axis of the sweep arm and is connected to the drive shaft by bevel gearing. Advantageously the driving sprocket is mounted on a shaft which is journalled in the housing. The housing is preferably arranged so that it can be secured against pivotal movement in any one of a number of pre-selected positions.

Known silo unloaders discharge the material removed from the silo onto a separately driven conveyor, thus involving the use of further power sources. According to the invention the drive means for the sweep arm conveyor may be arranged to drive a conveyor, which may be a belt conveyor, which is disposed to receive material removed from the silo by the sweep arm conveyor.

It has been found that such an arrangement can involve problems associated with the limited ground clearance of the discharge, or pivoted end of the bottom unloader. In order to overcome these difficulties we prefer that the pivotal mounting for the sweep arm should comprise a hollow generally cylindrical member arranged to be secured to, or made integral with, the sweep arm, the wall of the cylindrical member being discontinuous at a position intermediate its ends so that the cylindrical member comprises a spaced pair of co-axial annular members which are joined by an axially extending web which preferably extends circumferentially over approximately 90° of arc. The cylindrical member is journalled for pivotal movement on or in the drive shaft housing, with the drive shaft mounted to project into the interior of the cylindrical member through the space between the annular members thereof and drivingly engaging the sprocket drive shaft, which shaft is arranged to drive the driving drum of the conveyor for receiving material removed from the silo, via suitable gearing, e.g. bevel gears. The driving drum may be mounted on a shaft journalled in a housing which is mounted for pivotal movement about the pivotal axis of the sweep arm conveyor and which can be fixed in any one of a plurality of positions.

The housing supporting the drive shaft and the housing supporting the conveyor driving drum may be supported on a common member which forms part of the mounting means. The mounting means preferably also supports a pair of hydraulic rams which are arranged to swing the sweep arm conveyor from side to side about its pivotal mounting.

The invention is diagrammatically illustrated, by way of example, in the accompanying drawings, in which.

Figure 1:
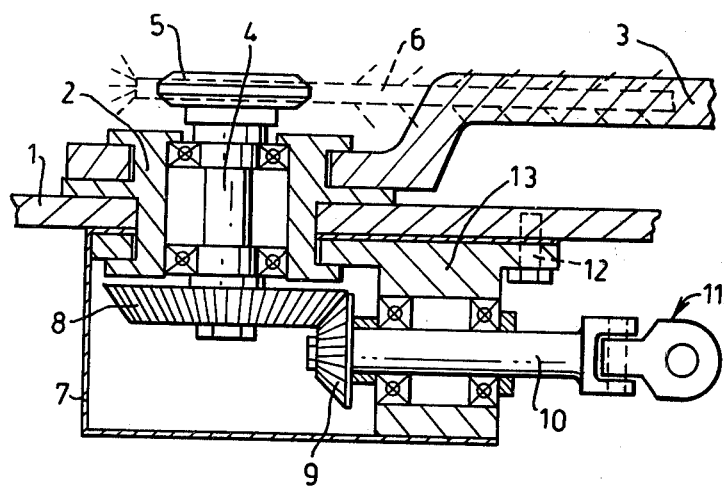
FIG. 1 is a sectional side elevation through part of a bottom unloader.
Figure 2:
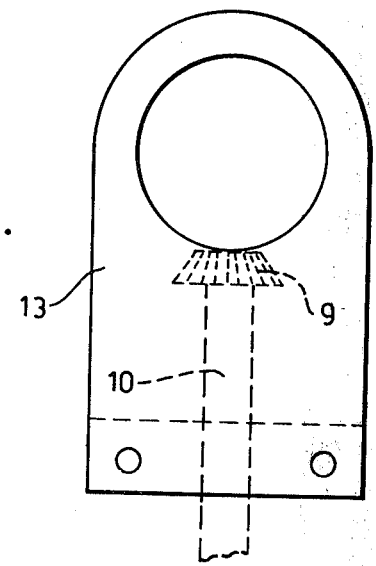
FIG. 2 is a plan view of the lower part of the apparatus shown in FIG. 1.
Figure 3:
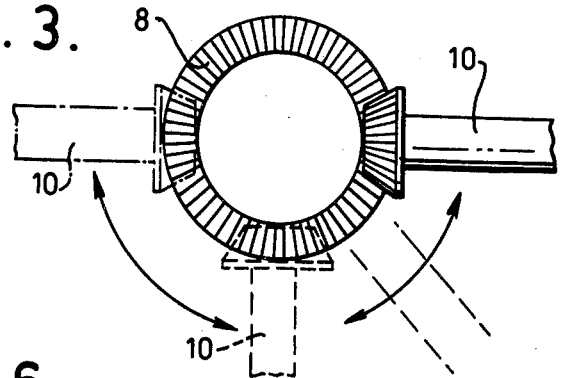
FIG. 3 illustrates diagrammatically the adjustability of the drive train to the unloader.
Figure 6:
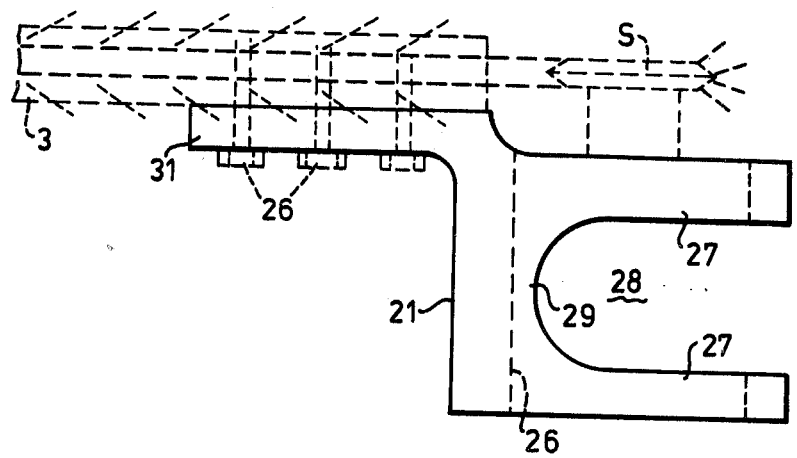
FIG. 6 is a side elevation of the outer end of the conveyor arm.
Figure 7:
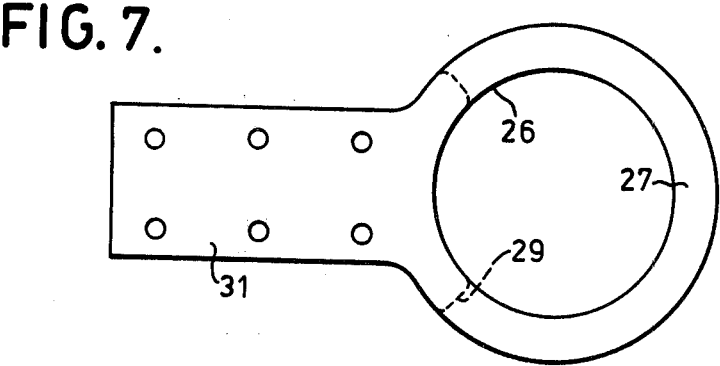
FIG. 7 is a plan view of the end of the conveyor arm shown in FIG. 6.
Figure 4:
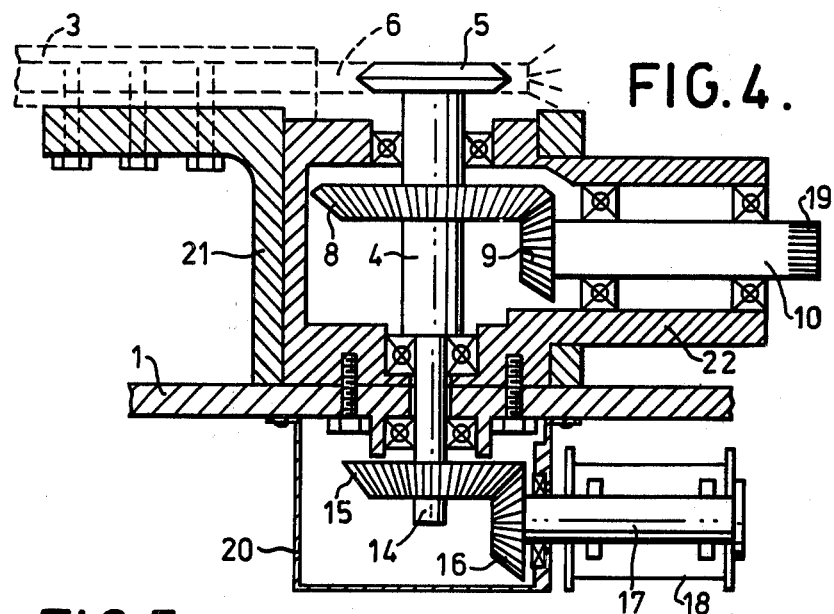
FIG. 4 is a sectional side elevation similar to that of FIG. 1 through the pivotal mounting of a bottom unloader.

In FIGS. 1 to 3 of the drawings, there is shown driving means for a bottom unloader for a storage silo which unloader may be of the kind described in the complete specifications of our British Pats. Nos. 1,262,451 and 1,262,452. A sweep arm conveyor 3 is pivotally mounted at its rearward or discharge end in a bearing member 2 which is secured to a housing 1 which can be removably fixed to the silo wall. The bearing member 2 has a shaft 4 journalled therein the axis of which shaft is co-axial with the pivotal axis of the arm 3, the shaft carrying at its upper end a sprocket 5 drivingly engaging an endless conveyor chain 6 which is carried in a track which extends round the periphery of the arm 3.

The member 2 also supports a carrier member 13 so that the carrier is pivotable about the axis of the shaft 4. The carrier is arranged so that it can be secured in any one of a plurality of positions by means of bolts 12 which can be engaged with a plurality of alternative screw-threaded bores provided in the housing 1. The carrier has a shaft 10 journalled therein which is drivingly connected to the shaft 4 via bevel gears 8 and 9. The bevel gearing is enclosed in a housing formed by the carrier member 13 and a box-like member 7. The free end of the shaft 10 carries a universal joint 11 by means of which the shaft can be connected to the power take-off mechanism of, for example, an agricultural tractor.

As shown in FIG. 3, arrangement described above permits the shaft 10 to be arranged in any of a variety of alternative positions to suit the particular conditions under which the unloader is being used.

The arrangement described with reference to FIGS. 4 to 7 of the drawings is similar to that described above and accordingly similar parts have been referenced similarly. The major inovation provided by the embodiment of FIGS. 4 to 7 is that the sprocket shaft 4 has been extended so that it also drives a conveyor which is arranged to receive material removed from the storage silo by means of the bottom unloader. To achieve this and because of the restricted space available the shaft 10 has been re-positioned above the main housing member 1 so that the drive train to the second conveyor can be accomodated below the member 1. To achieve this the bearing for the outer end of the sweep arm comprises a generally cylindrical member 21 formed with an integral lug 31 by means of which the member 21 is secured to the sweep arm 3 using bolts 26. The member 21 is hollow as shown at 26 and the wall of the cylindrical member is cut-away at a position intermediate its axial ends as shown at 28 so that the cylindrical member comprises a spaced pair of co-axial annular members 27 which are joined together by an axially extending web 29. As shown in the drawings the web extends over approximately 90° of arc. The cylindrical member 21 is journalled for pivotal movement on the normally stationary drive shaft housing 22 with the drive shaft 10 mounted to project into the interior of the cylindrical member through the space 28 therein and drivingly engaging the shaft 4 via bevel gearing 9 and 8 respectively. The free end of the drive shaft 10 is formed with a splined coupling 19 for engagement with the power take-off shaft of a tractor or the like. The housing 22 is bolted to the member 1, the bolts being removable so that the housing can be re-positioned whereby the working position of the shaft 10 can be changed.

The shaft 4 is extended downwardly as indicated at 14 and projects through a bore in the member 1, its lower end being provided with a bevel wheel 15 which engages a corresponding bevel wheel 16 provided on the end of a shaft 17 which is journalled in a housing 20 mounted on the underside of the member 1. The shaft 17 carries the driving drum 18 of a flat belt conveyor 23 which is disposed to receive material removed from the silo by the unloader. By providing a plurality of different positions for the bolts securing the housing 20 to the member 1, the effective position of the shaft 17 relative to the member 1 can be varied as shown in dotted lines in FIG. 5 of the drawings so that the disposition of the conveyor can be altered at will.

Figure 5:
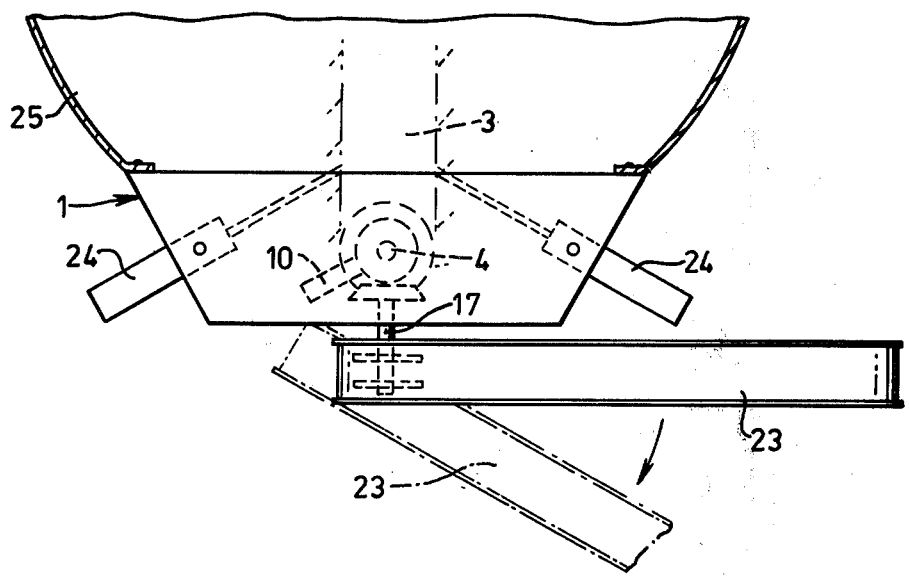
FIG. 5 is a schematic plan view showing the disposition of the outer end of the bottom unloader in a silo.

As is also shown in FIG. 5 of the drawings the housing 1 is secured to the wall 25 of the silo and carries hydraulic rams 24 which are connected to the sweep arm and swing the sweep arm from side to side during operation.

I claim:

1. A bottom unloader for a storage silo, the unloader comprising a sweep arm conveyor, means mounting the sweep arm conveyor so that it can be swung across the base of the silo and remove material therefrom, the mounting means comprising a pivotal mounting for the sweep arm, drive means for the sweep arm conveyor comprising a drive shaft journalled in a housing which housing is pivotable about the pivotal axis of the sweep arm so that the disposition of the drive shaft can be altered, and said drive means being arranged to drive a conveyor disposed to receive material removed from the silo by the sweep arm conveyor.

2. A bottom unloader according to claim 1, wherein the sweep arm conveyor is a chain conveyor having a driving sprocket which is co-axial with the pivotal axis of the sweep arm and is connected to the drive shaft by bevel gearing.

3. A bottom unloader according to claim 2, including a shaft journalled in said housing, and wherein the driving sprocket is mounted on said shaft which is journalled in the housing.

4. A bottom unloader according to claim 1, wherein the housing is arranged so that it can be secured against pivotal movement in any one of a number of pre-selected positions.

5. A bottom unloader according to claim 1, wherein the pivotal mounting comprises a hollow generally cylindrical member arranged, to be secured to the sweep arm, the wall of the cylindrical member being discontinuous at a position intermediate its ends so that the cylindrical member comprises a spaced pair of co-axial annular members which are joined by an axially extending web, the drive shaft being mounted to project into the interior of the cylindrical member through the space between the annular members thereof and drivingly engaging the sprocket drive shaft, which shaft is arranged to drive the conveyor for receiving material removed from the silo.

6. A bottom unloader according to claim 5, wherein the cylindrical member is journalled for pivotal movement on or in the drive shaft housing.

7. A bottom unloader according to claim 5, wherein a driving drum for the conveyor for receiving material removed from the silo is mounted on a shaft journalled in a housing which is mounted for pivotal movement about the pivotal axis of the sweep arm conveyor.

8. A bottom unloader according to claim 7, wherein the driving drum shaft is connected to the sprocket shaft by means of bevel gears.

9. A bottom unloader according to claim 7, wherein the housing supporting the drive shaft and the housing supporting the conveyor driving drum are supported on a common member which forms part of the mounting means.

10. A bottom unloader according to claim 7, wherein the mounting means supports a pair of hydraulic rams which are arranged to swing the sweep arm conveyor from side to side about its pivotal mounting.

* * * * *